United States Patent [19]

McGuire et al.

[11] Patent Number: 6,151,326

[45] Date of Patent: *Nov. 21, 2000

[54] METHOD AND APPARATUS FOR AUTOMATIC DEVICE SEGMENTATION AND PORT-TO-SEGMENT DISTRIBUTION

[75] Inventors: Robert M. McGuire; Robert L. Faulk, Jr., both of Roseville, Calif.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/738,960

[22] Filed: Oct. 24, 1996

[51] Int. Cl.$^7$ ........................................................ H04J 3/02
[52] U.S. Cl. .............................................................. 370/402
[58] Field of Search ...................................... 370/401, 402, 370/403, 404, 351, 389, 465, 352, 455, 456, 451, 252, 274, 285; 395/188.01, 187.01, 200.79, 200.8, 200.43, 200.68, 200.75

[56] References Cited

U.S. PATENT DOCUMENTS

| | | | |
|---|---|---|---|
| 5,432,907 | 7/1995 | Picazo | 370/401 |
| 5,629,685 | 5/1997 | Allen et al. | 370/462 |
| 5,720,032 | 2/1998 | Picazo | 370/401 |
| 5,740,164 | 4/1998 | Lizon | 370/356 |
| 5,740,171 | 4/1998 | Mazzola et al. | 370/399 |
| 5,859,837 | 1/1999 | Crayford | 370/446 |

*Primary Examiner*—Dang Ton

[57] ABSTRACT

Automatic device segmentation and port-to-segment distribution is provided in an electronic network. During a power-on sequence, the hardware and software of a network device determines if there is sufficient reason to segment a hub. Once a determination is made that there is a need for segmentation, the hub's ports are automatically divided into different segments in accordance with a predetermined port assignment scheme, such as by a predetermined port assignment (port 1 segment 1, port 2 segment 2, . . . ); assigning ports to different segments by cycling through the number of segments available as the ports become active; randomly assigning ports to the available segments; and using a negotiating mechanism to determine which ports go on which segments, where this latter approach may be based on such factors as the MAC address, the IP address, a virtual LAN identifier, any packet sent on the network, the existence of a manually operable switch, a cable determined by unique cable groups, or external wires or signals.

60 Claims, 5 Drawing Sheets

METHOD AND APPARATUS FOR AUTOMATIC DEVICE SEGMENTATION AND PORT-TO-SEGMENT DISTRIBUTION

BACKGROUND OF THE INVENTION

1. Technical Field

The invention relates to electronic communications networks. More particularly, the invention relates to automatic device segmentation and port-to-segment distribution in an electronic communications network having multisegment devices.

2. Description of the Prior Art

A network segment consists of repeaters, end stations, and network cabling (for example, see standard ISO/IEC 8802-3 for information on Ethernet networks). Such network segment has the capacity to transfer a limited amount of data per second. Data are transferred in the form of packets, which contain the address of the sending station (the source address) and the address of the intended recipient (the destination address).

When more than the maximum media speed of network data transfer capacity is required, multiple segments can be used. These segments can be interconnected through the use of bridges (bridges are defined in standard ISO/IEC 10038). The term switch has recently been applied to bridges. Switches are fast bridges which generally do not use a CPU to process the packets. Bridges contain two or more ports, each of which connects to a different segment. When two stations on different segments communicate with each other, the bridge forwards the packets between the two segments. When the stations are on the same segment, the bridge does not forward the packets to any other segment. The bridge may buffer data received on its ports to allow forwarding of the data later onto a different segment that was busy when the transmission first occurred.

As the number of end-nodes which access the network medium grows, it becomes statistically more likely that the medium is in use when a given end-node wants to transmit, thereby requiring the end node to wait. Thus, schemes which increase the amount of potential accessibility to, and throughput of, the network medium, without changing the type of physical network used (preserving the users' investment) are of great use and interest.

One way of increasing this bandwidth is to segment the shared network medium. This limits the number of users who have direct access (i.e. connections) to any one of these segments (or domains). If it is desired to have end-nodes in a domain communicate with end-nodes in other domains, bridging or switching across the segments may be employed, so that network packets for devices that are not in the immediate domain are forwarded until they reach the domain of the destination end-node.

While segmenting the networkcan improve bandwidth, the choice of where to segment, e.g. which nodes should be assigned to which segment, affects the success of the results. If all of the most active nodes remain on the same segment, access for any one of those active nodes is not much improved by this scheme, while the less active nodes on other segments have greatly increased opportunity for access but far less need of it. In this situation, the increased access is wasted on the wrong end-nodes.

One of the problems associated with a segmentable hub is bridging between the various segments. For example, individual segments may remain unbridged. One of the known ways of bridging segments is to use switch technology to take advantage of the multiple segments.

Network systems are inherently complex. A significant amount of technical education is required to understand, configure, and maintain any particular type of physical network, e.g. 10Base-T, Ethernet, Token Ring, or FDDI Bus networks. As the use of networks becomes widespread, the number of users responsible for such networks grows, while those among them who have sufficient knowledge to accomplish these tasks declines.

Thus, schemes which can configure, maintain, or improve network conditions without requiring much specific knowledge on the part of the user are also of great use and interest. Such ease of use, i.e. user friendly, schemes are often encompassed in software which is either embedded in the network device itself or is external to the network devices. Software that is embedded in the network device is generally are known as an agent. The external software is generally known as network management application software and is typically run by a system administrator on a management workstation.

Further, there is a need for balancing the flow of communications and data between nodes on network segments during initialization to obtain more throughput over the network. It would also be advantageous to provide a scheme that could be used for such desirable features as redundancy (providing an alternate path for communication), security (isolation of specific communications), and troubleshooting of a network (by systematic isolation of portions of the network to locate faulty wiring or end nodes).

SUMMARY OF THE INVENTION

The invention provides a method and apparatus for automatic device segmentation and port-to-segment distribution in an electronic network having multisegment devices. For example, during a power-on sequence the hardware and software of a network device according to the invention determines if the device, e.g. a hub, should be segmented.

This determination can be made using any of a number of methods, such as:

- The current setting of manually operable switches that are mounted on the hub;
- The existence or connection of certain components to or on the network device (hardware or software);
- Any activity on certain device ports, e.g. ports designated as server connection points or segment connection;
- Through negotiation via information sent on the network connections themselves;
- Through negotiation via information sent on an external connection (non-network connection) or similar technique to other network devices or management-type stations;
- Through a preset configuration setting, which could be a configuration file, a downloaded configuration image, a parameter block contained in memory, or which could have multiple levels of preset configurations from which a particular configuration is selected by an algorithm, manually operable switch, or other means of user input.

Sufficient reason to segment a hub includes, but is not limited to, any one or combinations of the following:

- More than one server;
- Heavy client-to-client communications;
- The existence of an internal bridge, switch, router, or other network bridging device, that provides bridging between device segments;
- The existence of multiple connections to an external bridge, switch, router, or other network bridging device;

The existence of network cabling which, when combined with the other network cabling, results in a non-standard compliant network; and The existence of one or more connections to an external repeater.

Having determined the device is to be segmented, the invention provides a technique that divides the ports on the device into different segments.

The technique for such division may include, for example, one of the following approaches:

A predetermined port assignment (port 1 segment 1, port 2 segment 2, . . . );

Assigning ports to a different segment by cycling through the number of segments available as the ports make themselves known, e.g. through link beat status, network traffic, and port auto sensing of connector installation;

Randomly assigning ports to available segments; and

Using a negotiating mechanism to determine which ports go on which segments. This could be based on such factors as the MAC address, the IP address, an IEEE 802.1 virtual LAN identifier, any packet sent on the network connection, data flow or current network activity, the existence of a manually operable switch, a cable conforming to a specific cable wiring scheme, or external means (wire or other signal).

The herein described automatic device segmentation and port-to-segment distribution invention offers users an ease of use feature, in which no action, or only minimal action, by the user is required other than physically assembling the device or device stack with a management card and a switch, and then powering-on the device. Thus, the invention provides a plug and play feature that configures the device to take advantage of the additional bandwidth made available by the invention. Such configuration may be automatic, manual, or a combination thereof.

DETAILED DESCRIPTION OF THE INVENTION

Figure 1:
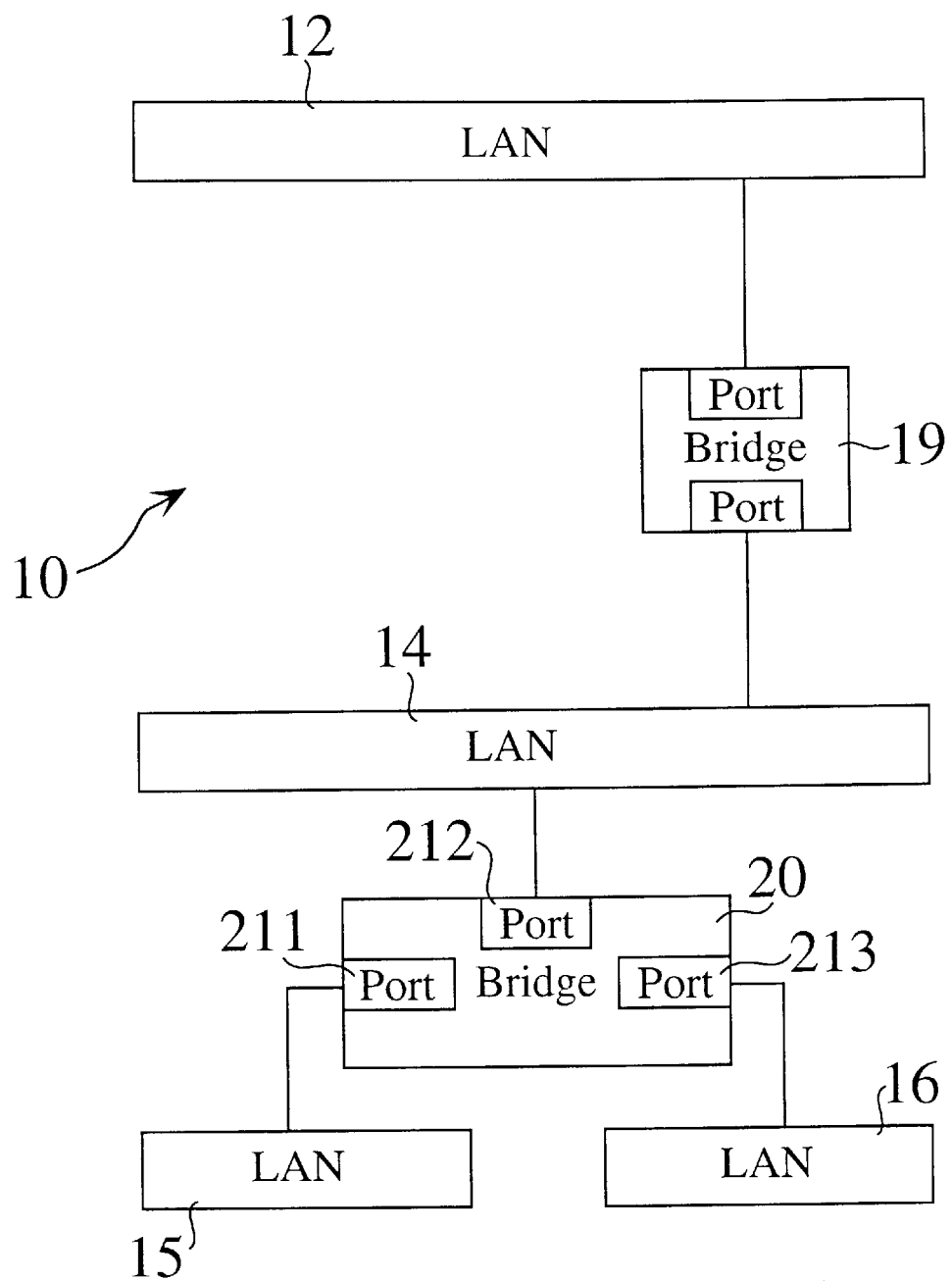
FIG. 1 is a block schematic diagram of an electronic communications network as is known in the prior art.

FIG. 1 is a block schematic representation of a common electronic communications network, such as an Ethernet network. The network 10 consists of several Local Area Networks (LANs) 13–16, each of which is interconnected through a number of bridges 19, 20. Each LAN is connected to one or more bridges. Connection between a LAN and a bridge is through a bridge port. For example, ports 211, 212, 213 are shown in connection with the bridge 20. The principle functions of the bridge are to relay and filter data frames, maintain the information required to make frame filtering and relaying decisions, and management of the foregoing operations. Although the preferred embodiment of the invention is discussed in connection with such an Ethernet network, the invention can readily operate with networks other than Ethernet networks. In fact, the invention herein described can apply at least to FDDI, as well as any of the networks specified in the IEEE 802 family of networking standards (e.g. 802.3 and 802.5).

The invention provides automatic segmentation and port-to-segment distribution, e.g. with regard to balancing the flow of communications and data between nodes on network segments to obtain more throughput on the network. The invention can also be used for redundancy, e.g. providing an alternate path for communication; security, e.g. isolation of specific communications; and troubleshooting of the network, e.g. by systematic isolation of portions of the network to locate faulty wiring or end nodes. In addition to the benefits listed above, such automatic segmentation offloads responsibility for the management of the network and network devices from the system administrator, thereby saving time and training.

Multisegment devices have become more prevalent because they can provide parallel paths instead of a single path. That is, the device may be connected to four servers and provide four times the throughput for the network clients. Accordingly, one aspect of the invention provides a technique for balancing the load at the device, therefore using the resources of the network more efficiently.

Network conditions that can benefit from segmenting a hub include, but are not limited to, any one or combinations of such factors as the presence of more than one server; a server having a high speed connection; heavy client-to-client communications; heavy traffic load on the primary segment or any particular segment in use; lack of traffic on any particular segment; the existence of an internal bridge, switch, router, or other network bridging device to bridge between the segments; the existence of multiple connections to an external bridge, switch, router, or other network bridging device to bridge between the segments; the existence of network cabling which, when combined with the other network cabling, results in a non-standard compliant network; and the existence of one or more connections to an external repeater.

During a power-on sequence, the hardware and software of a network device according to the invention determines if there is sufficient reason to segment the hub. This determination can be made using any of a number of methods, such as current setting of operable manually switches mounted on the hub; the existence or connection of certain components to or on the network device (hardware or software); any activity on certain device ports, e.g. server ports; through negotiation via information sent on the network connection itself, e.g. to another external network device; and through negotiation via information sent on an external connection (non-network wire) or similar means.

Having determined that there is need for segmentation, the invention provides a technique that divides the ports on the device into different segments by, for example, a predetermined port assignment scheme (port 1 segment 1, port 2 segment 2, . . . ); assigning ports to a different segment by cycling through the number of segments available as network traffic appears on different ports; randomly assigning ports to the available segments; and using a negotiating mechanism to determine which ports go on which segments. This latter approach could be based on such factors as the MAC address, the IP address, an IEEE 802.1 virtual LAN identifier contained in a packet, any packet sent on the network connection, traffic flow or types of data being transferred, the existence of a manually operable switch, a cable conforming to a specific cable wiring scheme, or external means (wire or other signal).

The automatic device segmentation and port-to-segment distribution invention offers users an ease of use feature, in which no action, or minimal action, by the user is required other than physically assembling the device or device stack with a management card and a switch, and then powering-on the device(s). Thus, the invention provides a plug and play feature for multisegment devices that automatically configures the device to take advantage of the additional bandwidth made available by the invention.

One aspect of the invention recognizes that segment assignment can be very confusing and therefore provides an automatic segmentation feature. Thus, when a device is added to a network, the device determines whether segmentation is available and, if so, aligns itself to the features provided by the devices and associated software. The invention contemplates several different ways to accomplish such segmentation. As the number of collision domains is increased, throughput is likewise increased, provided that there are enough other external devices (such as servers and personal computers) connected to the network that are available to use these domains.

The invention provides considerable flexibility, such that a hub need not be segmented at all, or it could be segmented in any way that is desirable based upon the traffic/network that the hub is servicing. In the preferred embodiment of the invention, the hub is automatically segmentable from a single segment to four segments. However, any number of segments may be provided, depending upon the application to which the invention is put.

In a client-server environment having two servers, the creation of four collision domains, instead of two collision domains, may not provide any significant improvement because the domains are affected by the bottleneck caused by the two servers. Nonetheless, there is an advantage provided by the invention if automatic segmentation is applied in the presence of a higher bandwidth connection. For example, a server having a 100 megabit order of magnitude instead of a 10 megabit order of magnitude could provide sufficient resources to maximize the benefit of having four collision domains.

The invention can also provide security by isolating users based on responsibility, e.g. the finance function of a company can be isolated from the marketing function by assigning segments exclusively for those functions. This feature of the invention selectively disables segment bridging to accomplish such isolation.

The preferred embodiment of the invention is based on dividing N ports equally across M hub segments, such that the user does not have to configure the hub and, therefore, does not have to move users among different ports. For example, if a device provides up to 200 ports on a hub and is divided into four segments, then it is necessary to move users in a coordinated fashion among the segments to get the benefit of segmentation. Instead of requiring that system personnel manually move users to different segments, one embodiment of the invention provides a hub that identifies the presence of a switch card and allows the hub to take advantage of the multiple segment bridging provided by the switch card.

One embodiment of the invention requires the device to listen for traffic and then assign each port, in accordance with the occurrence of traffic on that port, to successive segments. Thus, if there was traffic on port N, where port N was assigned to segment 1, and then on any other port, e.g. N+1, N-6, or anywhere else, the invention assigns such other port to segment 2, so that ports are assigned to segments based on the order in which traffic is received through the port, and not on the physical order of the port on the hub. This embodiment of the invention is useful to provide true load balancing.

Unfortunately, some users may become confused by such approach because they cannot determine the reason why the ports were assigned in the fashion in which they are, solely by accessing the back of the hub, i.e. by viewing the LED indicators on the hub. The invention therefore provides various algorithms by which ports are assigned to segments in a readily comprehended fashion.

Another embodiment of the invention provides a simple algorithm, in which port #1 is placed on segment 1, port #2 is placed on segment 2, port #3 is placed on segment 3, and port #4 is placed on segment 4. This pattern is then repeated in sequential order for each additional port. This more intuitive approach has the advantage of being better understood by support personnel who are troubleshooting the network.

The collision domains of the preferred embodiment of the invention are based on a single subnet. Another embodiment may assign ports based on an identified IP address. Traffic may be initially monitored from users from different subnets, and then users sharing the same IP subnet would be assigned to their own segment. Thus, the invention allows users to be assigned to segments based upon any appropriate preselected criteria. One embodiment of the invention provides a management function that allows the selection of any of various segmentation algorithms, if desired. Although the preferred embodiment of the invention provides automatic segmentation and port assignment, and thereby spares the system administrator from having to understand segmentation.

Figure 2A:
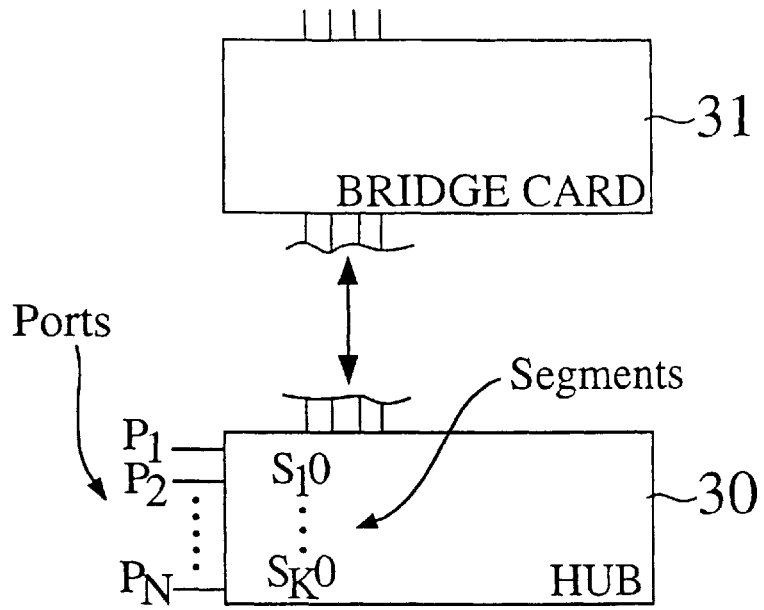
FIG. 2a is a block schematic diagram of an exemplary hardware environment according to the invention.
Figure 2B:
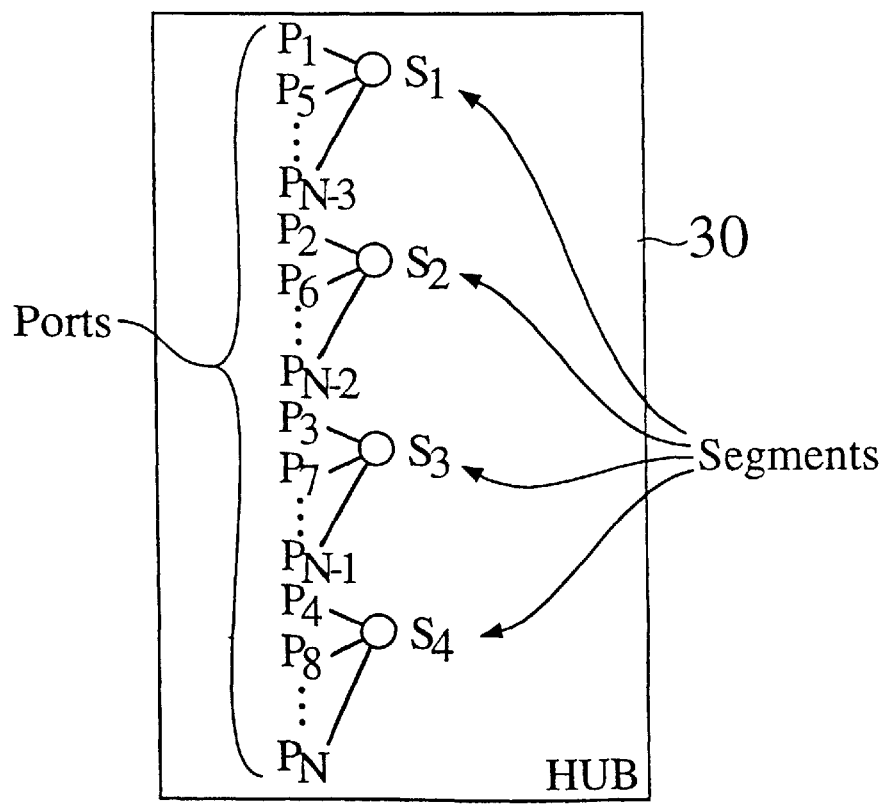
FIG. 2b shows an exemplary algorithm for assigning ports to segments according to the invention.

FIG. 2a is a block schematic diagram that shows a hub 30 having ports P1 through Pn and a bridge card 31 that bridge ports to segments S1 through Sk. The bridging function is readily implemented by such known approaches as switch technology, e.g. a software or hardware bridge, or any other technique that allows communication between segments. FIG. 2b shows an exemplary algorithm for assigning ports P1 to Pn to four segments S1 to S4. For this embodiment of the invention it is assumed that there are four segments and that the ports are assigned to segments in numerical order (as described above), such that ports P1, P5, and Pn-3 are assigned to segment S1; P2, P6, and Pn-2 are assignment to segment S2; and so forth.

One embodiment of the invention uses a feature card that is manufactured to provide eight 10Base-T connections, that is one internal connection for each of the four segments and four external connections. Thus, such external connections could be made to servers, a backbone, or another hub or stack of hubs, as desired. This embodiment of the invention uses the presence of said feature card to cause automatic device segmentation and port assignment. It should be appreciated that the feature card need not be a separate module, but may comprise an integrated solution.

Other embodiments of the invention do not use a feature card. A simpler embodiment assigns specific ports on the device as key segmentation ports. When activity on those ports is detected, a new segment containing that port is created. The port assignment feature then moves other ports to that segment.

In another embodiment, the invention may be used with any segmentable hub where individual ports can be assigned to any of the segments, but with another algorithm in which a network administrator communicates with the hub, either over the network connection or over a separate connection, to inform the hub that there is another device that is providing segment bridging, identify which port or ports are connected to the device, and then segment the hub around those ports.

Figure 3:
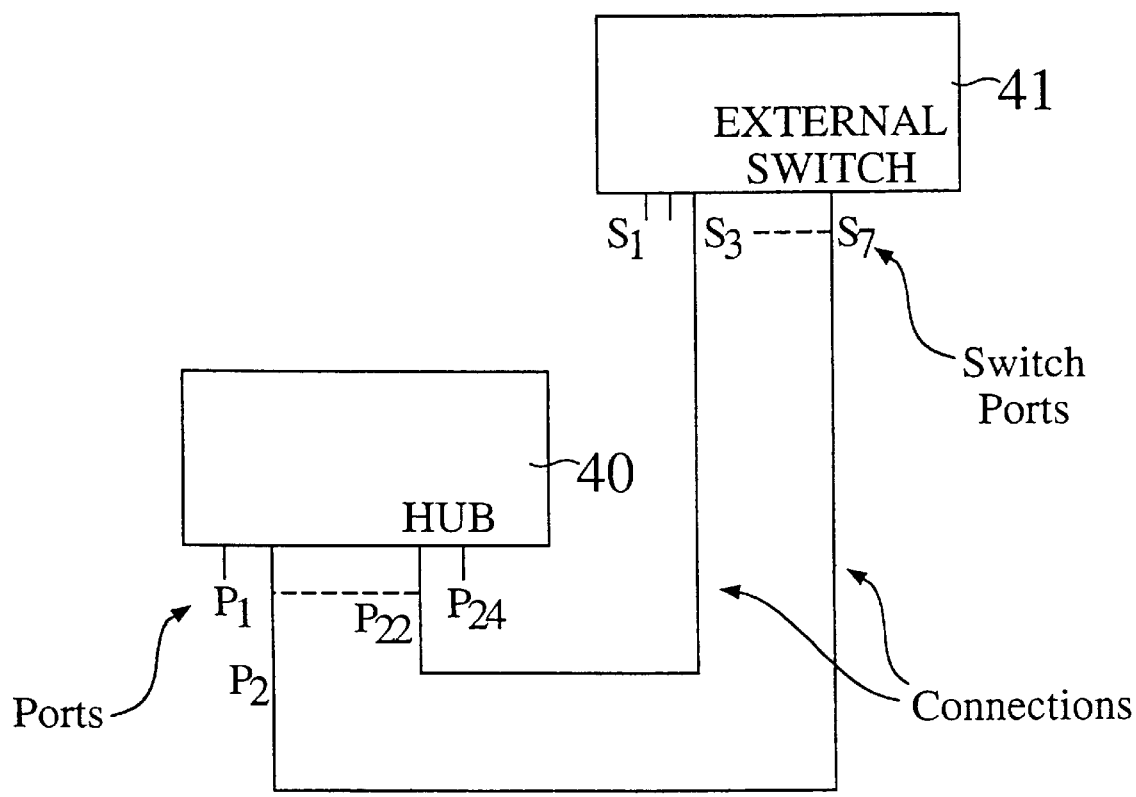
FIG. 3 is a block schematic diagram of an apparatus for automatic device segmentation and port-to-segment distribution according to an exemplary embodiment of the invention.

For example, FIG. 3 is a block schematic diagram that shows a hub 40 having ports P1 to P24 and an external switch 41. In this example, the external switch is connected to port P22 on the hub and port S3 on the switch. With the invention, it is possible to send information across the network connection, such that one device is aware of the other device, or both devices are aware of each other, i.e. the hub knows that there is a switch that can bridge between segments. Thus, if another port, such as port P2, of the hub is also connected to the switch, for example at port S7, then the hub is divided into two segments. Accordingly, the bridging function of the external switch is used in the invention to determine how many ports are connected to that external switch, and the hub then assigns its ports to create an appropriate number of segments.

Communication of information between the hub and switch can be along the network connection or along an external line that is connected between the switch and the hub, i.e. out-of-band communication, such as via an RS-232 connection. The invention allows a determination, either internally or externally, of whether the ports on the hub are connected to a bridging device and whether the ports are unique. The determination of uniqueness is necessary because network loops must be avoided.

The invention divides the hub into the number of segments for which connections are available at the external switch, up to a maximum of four segments in the preferred embodiment of the invention because the exemplary hub is a four segment hub. For example, if ports P2 and P22 are active, then the invention may employ an algorithm that assigns port P2 to one segment and port P22 to another segment. The rest of the ports are then divided on the hub among those two segments, which are referred to for purposes of this examples as segments A and B. One embodiment of the invention provides an algorithm that places a first one-half of the ports on segment A and the other one-half of the ports on segment B. If bridging to a third segment was provided, then the ports could be assigned in thirds, and so on.

Figure 4:
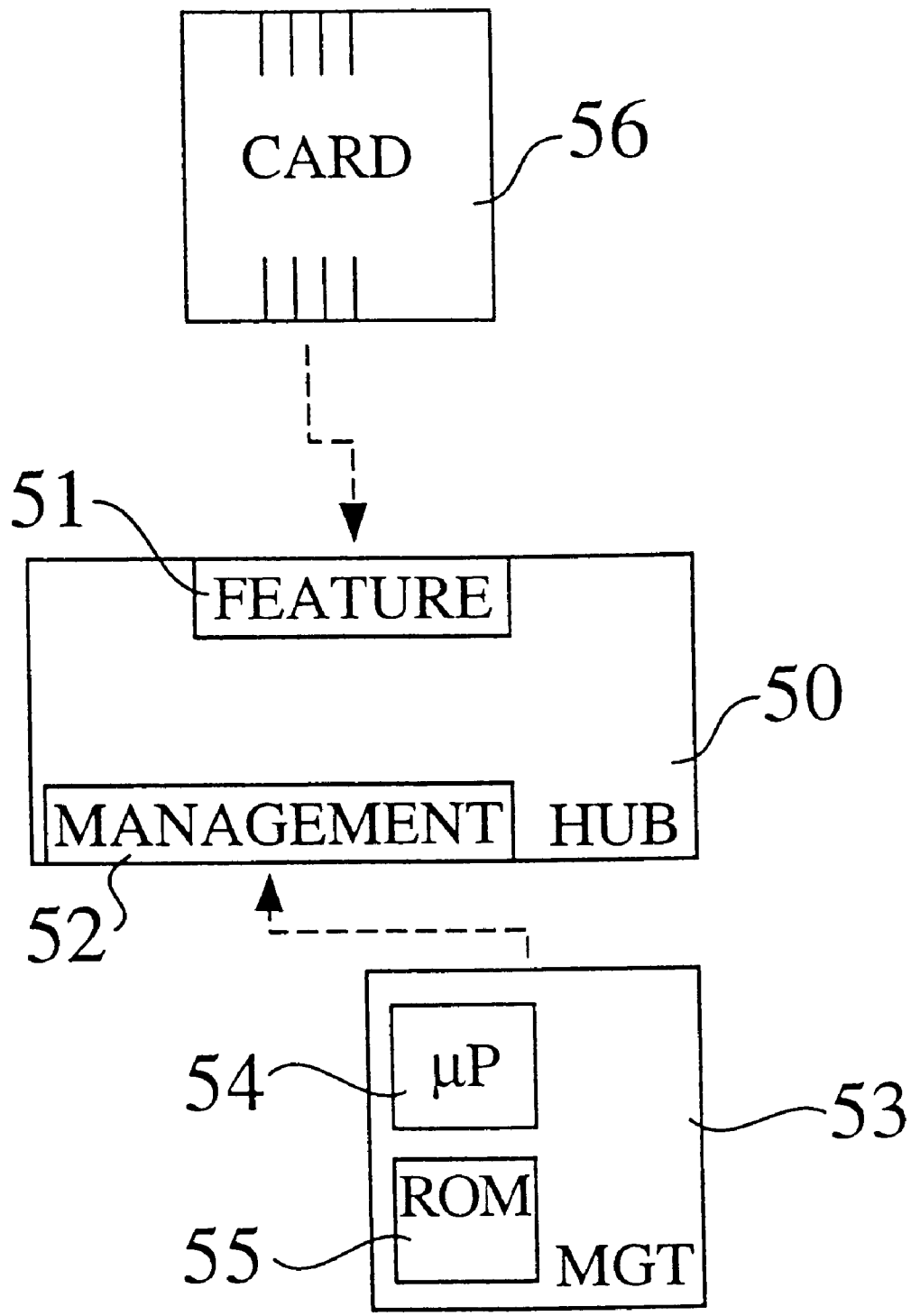
FIG. 4 is a block schematic diagram of a hub that includes slots for a feature card, e.g. bridging card or switch, and for a management card according to an exemplary embodiment of the invention.

FIG. 4 is a block schematic diagram of an embodiment of the invention that provides a hub 50 that includes a first feature slot 51 which is adapted to receive a card that embodies the switching function, and a second management slot 52 which is adapted to receive a card 53 that includes a microprocessor 54 and memory 55 that stores system software. In this embodiment, the stand-alone hub without a management card provides only a single segment. By adding the management card, the hub is provided with the ability to determine what is happening in the hub and to monitor the hub's performance, such that the hub can be used as a segmentable hub.

In another embodiment of the invention, the feature slot can receive a card that provides a multi-segment bridging function and automatic segmentation. However, in the embodiment of the invention described by FIG. 4, the feature slot receives a card that the management card recognizes and that is used to trigger such automatic segmentation. It should be appreciated that such cards need not be provided as separate modules, but may comprise an integrated solution or combinations thereof.

The sequence for installation and use of a preferred embodiment of the invention involves the following steps:

Unpack the hub and the management board;
Install the management board;
If a switch card is provided, then:
  Unpack the switch card;
  Install the switch card; and
Connect the network cabling;
Power-on the hub;
If there is no management card and no switch card, then the hub remains a single segment or collision domain;
If there is no management card and a switch card, then the switch segments the hub;
If there is a management card and a switch card, then:
  The switch card does not segment the hub; and
  The management card segments the hub.

Figure 5:
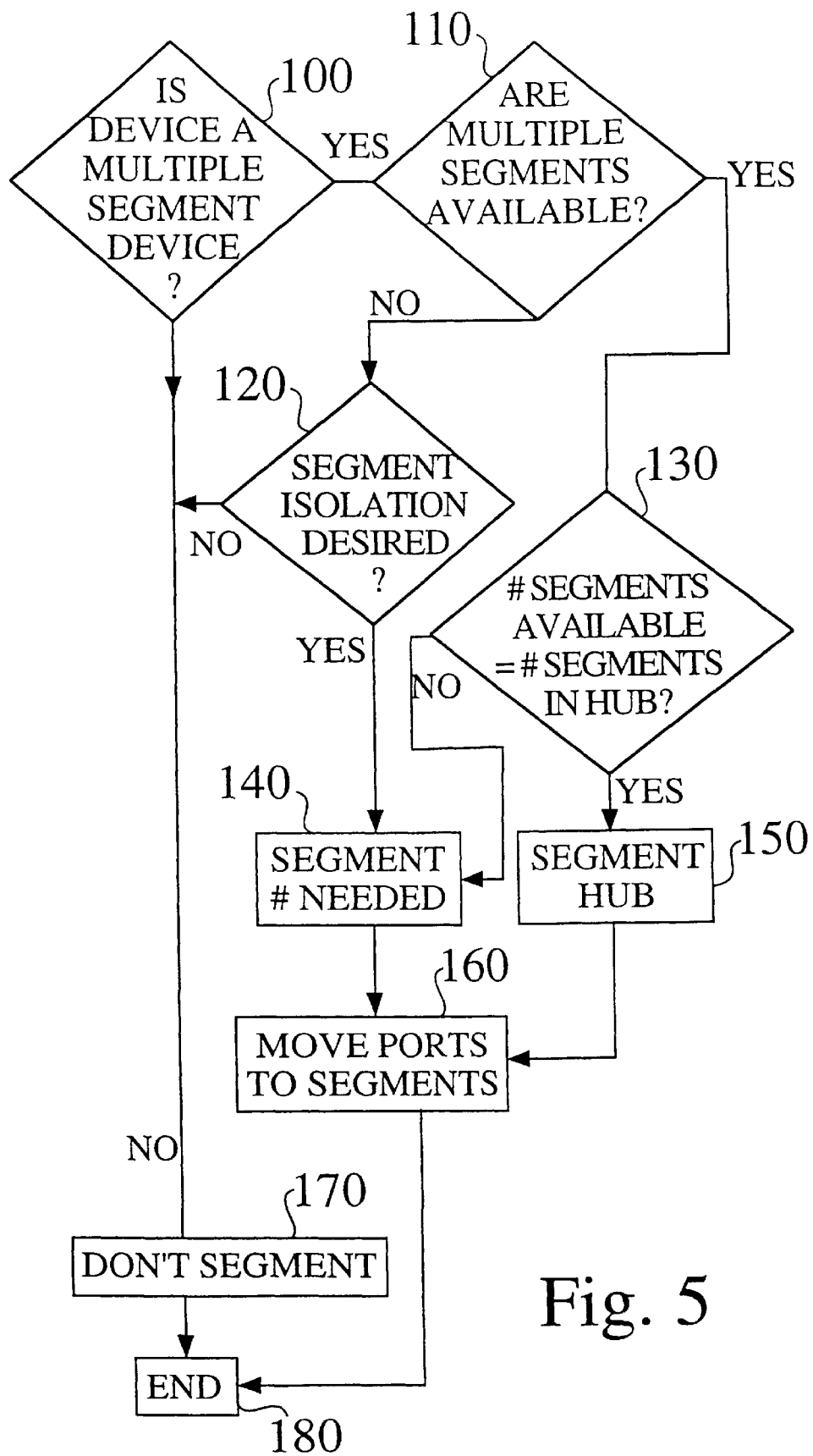
FIG. 5 is a flow diagram showing an example of a segmentation determination according to an exemplary embodiment of the invention.

FIG. 5 is a flow diagram showing an example of a segmentation determination according to the invention. A determination is made if the device is a multiple segment device (100). If the device is not a multiple segment device, then there is no segmentation (170) and the sequence ends (180).

If the device is a multiple segment device, then a determination is made if multiple segments are available (110). If multiple segments are not available, a determination is made if segment isolation is desired (120). If not, then there is no segmentation (170) and the sequence ends (180). If segment isolation is desired (120), then a determination is made concerning the number of segments needed (140), the ports are moved to the appropriate segments (160), and the sequence ends (180).

If multiple segments are available (110), a determination is made whether the number of segments available is equal to, or not equal to, the number of segments in the hub (130). If so, then the hub is segmented (150) and the sequence ends (180).

Another embodiment of the invention uses pattern specific 10Base-T connections. In 10Base-T, only two pairs of a four pair set of wires are used to carry the network traffic. One embodiment of the invention provides a scheme where the 3rd and 4th pairs of wires have varying electrical states driven by one network device, e.g. the switch, that allows a second network device, e.g. the hub, to detect and recognize the external device when such external device is directly connected to one of its ports. In one form of this scheme, the external device ties the pairs of wires together electrically to create a loop.

In a more complex form, this scheme connects the different individual wires to ground or to a positive voltage. Thus, the four wires of the two unused pairs could yield 16 different combinations that can be used to identify the external devices explicitly. This scheme makes device discovery by individual network devices much quicker and simpler.

This scheme can be used with other network technologies, but the number of open wire pairs may differ, depending upon the connector used and the number of pairs used to transmit data. Additionally, the number of combinations available can be increased by using analog logic, instead of digital logic.

Some of the features provided by the invention also include:

Automatic Fault Isolation—The movement of end-nodes (or groups) off of a particular segment to determine which portions of the network are faulty (e.g. wiring, other network devices, or end-nodes). This feature may move end-nodes to alternate segments once it has been determined that a particular segment has been isolated due to a cable break, device failure, or other network disturbance.

Automatic Security—The movement of end-nodes to a particular segment to isolate that group for the purpose of limiting the communications between said nodes (e.g. data or video conferencing and secure memos).

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed:

1. An apparatus for automatic segmentation and port-to-port segment distribution in an electronic network, comprising:

a device comprising a plurality of ports; and, a mechanism that is able to segment the plurality of ports and to assign any port to any segment and to move ports between segments, the mechanism during a power-on sequence dividing said plurality of ports on said device into different segments in accordance with a predetermined port assignment scheme, each segment being a separate collision domain handled by the device.

2. The apparatus of claim 1, wherein said predetermined port assignment scheme assigns each of said plurality of ports to said different segments in sequential order.

3. The apparatus of claim 1, wherein said predetermined port assignment scheme assigns each of said plurality of ports to said different segments by cycling through available said different segments in an order that is defined by network traffic appearing on said plurality of ports.

4. The apparatus of claim 1, wherein said predetermined port assignment scheme randomly assigns each of said plurality of ports to available said different segments.

5. The apparatus of claim 1, wherein said predetermined port assignment scheme uses a negotiating mechanism to determine which of each of said plurality of ports go on which of said different segments.

6. The apparatus of claim 5, wherein said negotiating mechanism is based on either a MAC address or an IP address.

7. The apparatus of claim 5, wherein said negotiating mechanism is based on a virtual LAN identifier.

8. The apparatus of claim 5, wherein said negotiating mechanism is based on any packet sent on a network connection.

9. The apparatus of claim 5, wherein said negotiating mechanism is based on the existence of a manually operable switch.

10. The apparatus of claim 5, wherein said negotiating mechanism is based on a cable determined by unique cable groups, or based on determination of a noncompliant network topology.

11. The apparatus of claim 5, wherein said negotiating mechanism is based on an external connection, or the existence of an external repeater.

12. The apparatus of claim 5, wherein said predetermined port assignment scheme further comprises:

a network traffic monitoring mechanism; and means, operable in conjunction with said traffic monitoring mechanism, for determining placement of each of said ports on said different segments.

13. The apparatus of claim 12, wherein said determination is made using a current setting of manually operable switches mounted on said device.

14. The apparatus of claim 12, wherein said determination is made using the existence or connection of certain components to or on a network device.

15. The apparatus of claim 12, wherein said determination is made using any activity on certain device ports.

16. The apparatus of claim 12, wherein said determination is made using through negotiation via information sent on a network connection.

17. The apparatus of claim 12, wherein said determination is made using through negotiation via information sent on an external, non-network connection.

18. The apparatus of claim 12, wherein sufficient reason to segment said device comprises the presence of a server with a higher speed connection, or more than one server.

19. The apparatus of claim 12, wherein sufficient reason to segment said device comprises heavy client-to-client communications.

20. The apparatus of claim 12, wherein sufficient reason to segment said device comprises the existence of an internal bridge, switch, router, or other network bridging device.

21. The apparatus of claim 12, wherein sufficient reason to segment said device comprises the existence of multiple connections to an external bridge, switch, router, or other network bridging device.

22. The apparatus of claim 1, further comprising:

a 10Base-T connection to said device, said 10Base-T connection comprising a plurality of wire pairs of device wires:

wherein at least one of said plurality of wire pairs have varying electrical states that allow said device to detect and recognize various external devices directly connected to said device through said at least one of said plurality of wire pairs.

23. The apparatus of claim 22, wherein said varying electrical states are determined by electrically tying said at least one of said plurality of wire pairs of said device wires together to create a loop.

24. The apparatus of claim 22, wherein said varying electrical states are determined by connecting at least one of said device wires of said at least one of said plurality of wire pairs to ground or to a positive voltage to yield different combinations that correspond to digital identification numbers.

25. The apparatus of claim 1, wherein said device comprises:

a hub.

26. The apparatus of claim 1, wherein said mechanism comprises:

a bridge, switch, or router.

27. The apparatus of claim 1, wherein said device is adapted to receive said mechanism therein.

28. The apparatus of claim 1, wherein any of a plurality of said predetermined port assignment schemes are available for selection.

29. The apparatus of claim 1, said mechanism further comprising:

an automatic fault isolation mechanism that moves end-nodes or groups from a particular one of said different segments to determine which portions of a network are faulty;

wherein said fault isolation mechanism moves said end-nodes to alternate of said different segments once it has been determined that said particular one of said different segments has been isolated due to a cable break, device failure, or other network disturbance.

30. The apparatus of claim 1, said mechanism further comprising:
an automatic security mechanism that moves end-nodes to a particular one of said different segments to isolate a predetermined group and thereby limit communications between said nodes.

31. A method for automatic segmentation and port-to-segment distribution in an electronic network, comprising the steps of:
providing a device comprising a plurality of ports;
providing a mechanism that is able to segment the plurality of ports and to assign any port to any segment and to move ports between segments; and,
dividing during a power-on sequence, said plurality of ports on said device into different segments in accordance with a predetermined port assignment scheme, each segment being a separate collision domain handled by the device.

32. The method of claim 31, wherein said predetermined port assignment scheme assigns said plurality of ports to said different segments in sequential order.

33. The method of claim 31, wherein said predetermined port assignment scheme assigns each of said plurality of ports to said different segments by cycling through available said different segments in an order that is defined by network traffic appearing on said plurality of ports.

34. The method of claim 31, wherein said predetermined port assignment scheme randomly assigns said plurality of ports to available said different segments.

35. The method of claim 31, wherein said predetermined port assignment scheme uses a negotiating mechanism to determine which of said plurality of ports go on which of said different segments.

36. The method of claim 35, wherein said negotiating mechanism is based on a MAC address or IP address.

37. The method of claim 35, wherein said negotiating mechanism is based on a virtual LAN identifier.

38. The method of claim 35, wherein said negotiating mechanism is based on any packet sent on a network connection.

39. The method of claim 35, wherein said negotiating mechanism is based on the existence of a manually operable switch.

40. The method of claim 35, wherein said negotiating mechanism is based on a cable conforming to a specific cable wiring scheme, or determination of a nonstandard network topology.

41. The method of claim 35, wherein said negotiating mechanism is based on an establishment of an external connection to said device, or the establishment of one or more connections between said device and an external repeater.

42. The method of claim 31, further comprising the step of:
determining if said device should be segmented.

43. The method of claim 42, wherein said determination is made using a current setting of manually operable switches mounted on said device.

44. The method of claim 42, wherein said determination is made using the existence or connection of certain components to or on a network device.

45. The method of claim 42, wherein said determination is made using any activity on certain device ports.

46. The method of claim 42, wherein said determination is made using through negotiation via information sent on a network connection.

47. The method of claim 42, wherein said determination is made using through negotiation via information sent on an external connection or link.

48. The method of claim 42, wherein determination of whether said device should be segmented comprises detecting the presence of a server with a higher speed connection, or more than one server.

49. The method of claim 42, wherein determination of whether said device should be segmented comprises detecting heavy client-to-client communications.

50. The method of claim 42, wherein determination of whether said device should be segmented comprises detecting the existence of an internal bridge, switch, router, or other network bridging device.

51. The method of claim 42, wherein determination of whether said device should be segmented comprises detecting the existence of multiple connections to an external switch, router, or other network bridging device.

52. The method of claim 31, further comprising the step of:
establishing a 10Base-T connection to said device, said 10Base-T connection comprising a plurality of wire pairs of device wires;
wherein at least one of said plurality of wire pairs have varying electrical states that allow said device to detect and recognize various external devices directly connected to said device through said at least one of said plurality of wire pairs.

53. The method of claim 52, wherein said varying electrical states are determined by electrically tying said at least one of said plurality of wire pairs of said device wires together to create a loop.

54. The method of claim 52, wherein said varying electrical states are determined by connecting at least one of said device wires of said at least one of said plurality of wire pairs to ground or to a positive voltage to yield different combinations that correspond to digital identification numbers.

55. The method of claim 31, wherein said device comprises:
a hub.

56. The method of claim 31, wherein said mechanism comprises:
a bridge, switch, or router.

57. The method of claim 31, wherein said device is adapted to receive said mechanism therein.

58. The method of claim 31, wherein any of a plurality of said predetermined port assignment schemes are available for selection.

59. The method of claim 31, further comprising the step of:
moving end-nodes or groups from a particular one of said different segments to determine which portions of a network are faulty;
wherein said end-nodes are moved to alternate of said different segments once it has been determined that said particular one of said different segments has been isolated due to a cable break, device failure, or other network disturbance.

60. The method of claim 31, further comprising the step of:
moving end-nodes to a particular one of said different segments to isolate a predetermined group and thereby limit communications between said nodes.

* * * * *